United States Patent [19]

Hasebe et al.

[11] 4,105,158
[45] Aug. 8, 1978

[54] PREHEATING AND WARMING APPARATUS FOR USE WITH VEHICLES

[75] Inventors: Nobutoshi Hasebe, Ibaraki; Toshiyuki Itoh, Katsuta; Takashi Hashimoto, Ibaraki, all of Japan

[73] Assignee: Hitachi, Ltd., Japan

[21] Appl. No.: 748,330

[22] Filed: Dec. 7, 1976

[30] Foreign Application Priority Data

Jan. 19, 1976 [JP] Japan ................... 51-4130

[51] Int. Cl.² .......................................... B60H 1/02
[52] U.S. Cl. ................... 237/12.3 C; 165/41; 431/184; 126/101; 432/219; 98/2.05
[58] Field of Search .................. 237/12.3 R, 12.3 C, 237/12.3 A, 12.3 B; 98/2.05, 2.06; 126/101; 432/219, 222, 223; 165/41; 123/142.5, 122 AA, 179 H; 60/39.18 A, 39.18 B; 431/158, 182, 185, 184

[56] References Cited

U.S. PATENT DOCUMENTS

| | | | |
|---|---|---|---|
| 2,021,569 | 11/1935 | Pasco | 237/12.3 C |
| 2,044,296 | 6/1936 | Handgrove | 431/184 |
| 2,325,443 | 7/1943 | Vroom | 431/184 |
| 2,616,412 | 11/1952 | Backus | 237/12.3 C |
| 2,911,789 | 11/1959 | Baker | 60/39.18 B |
| 3,942,719 | 3/1976 | Blomberg | 237/12.3 C |

*Primary Examiner*—John J. Camby
*Assistant Examiner*—Henry C. Yuen
*Attorney, Agent, or Firm*—Craig & Antonelli

[57] ABSTRACT

Preheating and warming apparatus for use with vehicles comprising an outer housing provided with a clean air inlet port, a clean air outlet port and an exhaust gas outlet port, an inner housing having the interior thereof divided by a partition into a clean air introducing chamber and a combustion chamber, a fan motor disposed in the clean air introducing chamber and mounting a combustion fan on one of two output shafts of the fan motor, a sucking fan mounted on the other output shaft of the fan motor and disposed in the vicinity of the clean air inlet port of the outer housing, fuel injection means secured to the partition wall, a baffle plate disposed adjacent to the fuel injection means in the combustion chamber, a coiled water heating tube disposed in the combustion chamber, and radiation fins secured to the outer peripheral surface of the portion of the inner housing defining the combustion chamber, said components constituting a combustor for effecting combustion of liquid fuel to generate heat, said heat being used for heating air and water adapted to be supplied to a cabin and other accessories of the vehicle to heat them up.

16 Claims, 6 Drawing Figures

PREHEATING AND WARMING APPARATUS FOR USE WITH VEHICLES

BACKGROUND OF THE INVENTION

The present invention relates to preheating and warming apparatus for use with vehicles and, more particularly, to preheating and warming apparatus for use with vehicles suitable for heating cabins or other accessories of automobiles.

Conventionally, warming apparatus using liquid fuel includes a horizontally disposed electric motor carrying a fan for circulating heated air and another fan for feeding combustion air, said fans being mounted on respective output shafts of the motor, and a rotary type fuel distributor adapted to atomize and distribute or spread the fuel within a combustion chamber by a centrifugal force. However, this rotary type fuel distributor cannot provide a satisfactorily small particle size of fuel and a good pattern of fuel distribution or spreading, which results in a deteriorated evaporation of fuel. In order to improve the situation in such fuel distributor, means such as glow plugs have been provided for enhancing the evaporation of fuel. The provision of such means for evaporation of fuel, however, results in a complicated structure and in poor starting characteristics, i.e. lack of instantaneous response at the time of starting, thus rendering the system unsuitable as preheating and warming apparatus. The warming apparatus of the type provided with the additional means for the fuel evaporation has been found inconvenient, especially for use with vehicles where the installation space is limited, and could not provide a satisfactory heating distribution.

SUMMARY OF THE INVENTION

The present invention ensures, in its one aspect, improved starting characteristics by utilizing a pressurizing fuel injection nozzle.

According to another aspect of the invention, a swirler is mounted close to the injection nozzle for putting the flame in good order, and a coiled water tube is provided in the combustion chamber to simultaneously obtain hot air and hot water.

It is therefore an object of the present invention to provide warming apparatus adapted for use with vehicles and having good starting characteristics for combustion.

DESCRIPTION OF THE PREFERRED EMBODIMENT

Figure 1:
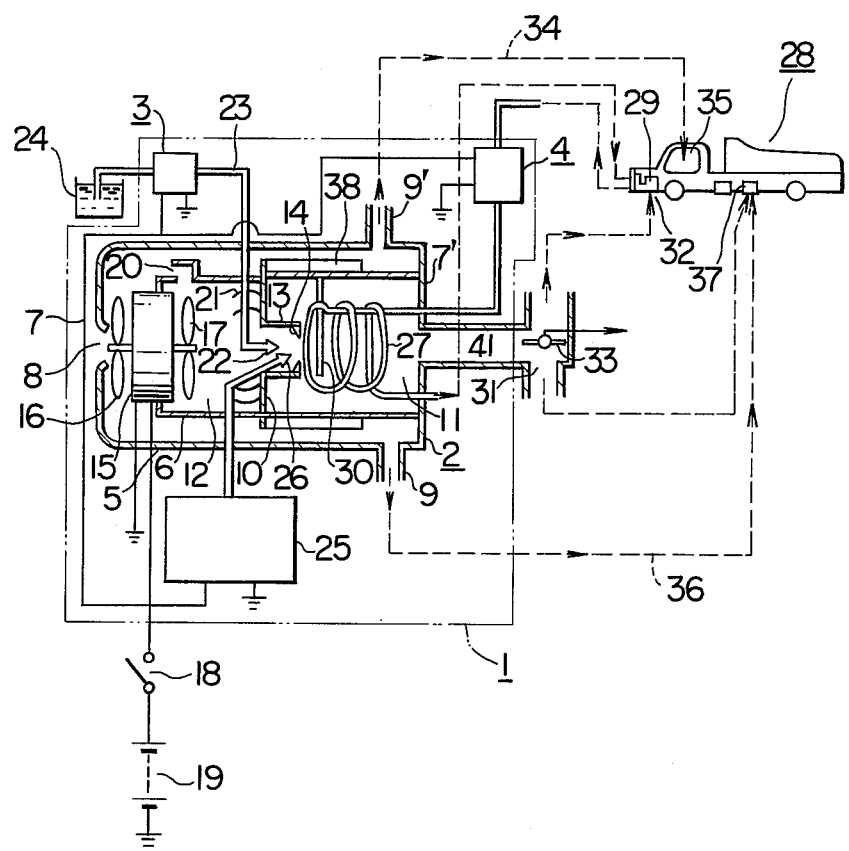
FIG. 1 is a side elevational view of a preheating and warming apparatus according to a preferred embodiment of the present invention, showing pipe connections between the means and a vehicle on which the means are mounted.

Referring to the drawings, a preheating and warming apparatus for use with vehicles is generally designated at a reference numeral 1 in FIG. 1, and is especially adapted for heating engines, batteries and cabins of the vehicle on which the apparatus is mounted.

The apparatus 1 comprises a combustor 2 for burning fuel therein to delivering hot water and hot air to the vehicle, a fuel pump 3 for supplying fuel to the combustor 2, and a hydraulic pump 4 for circulating hot water through the piping disposed within the combustor and around the engine of the vehicle.

The combustor 2 has a cylindrical-shaped outer housing 5 made of steel plate and a cylindrical-shaped inner housing 6 also made of steel plate and disposed within the outer housing 5. The outer housing includes a first clean air inlet port 8 formed in one end wall 7 and for introducing external clean air into the apparatus, a combustion gas outlet 41 formed in the other end wall 7' and for directing combustion gas to the engine and the battery of the vehicle, and a clean hot air outlet 9 formed close to the other end wall 7' in the peripheral wall of the outer housing.

Figure 2A:
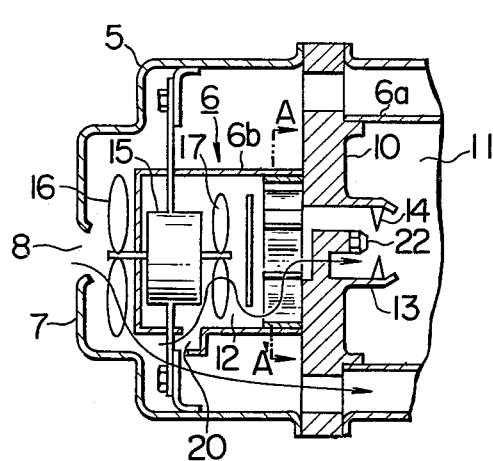
FIG. 2A is a partial sectional view of a chamber for introducing clean air into the heating apparatus of FIG. 1.

Preferring now to FIG. 2A, the inner housing 6 is comprised of a first portion 6a defining a combustion chamber 11 and a second portion 6b defining a chamber 12 for introducing clean air.

The first and second portions of the inner housing are separated from each other by means of a partition wall 10. The first portion 6a is secured to the partition wall 10 and to the other end wall of the outer housing. The second portion 6b is secured to the partition wall 10, and is provided with more than one second clean air inlet port 20 formed in its peripheral wall. As shown in FIG. 2A, the second portion 6b accomodates a fan motor 15 secured to the inner wall of the outer housing 5. The outer shafts of the motor 15 project outwardly on the opposite sides of the motor, and mount a sucking fan 16 and a combustion fan 17 thereon. The sucking fan 16 is interposed between the end wall of the second portion 6b of the inner housing and the end wall 7 of the outer housing 5, and is adapted to introduce clean air from outside through the first clean air inlet port 8. The combustion fan 17 is housed within the clean air introduction chamber 12, and is adapted to introduce air through the second clean air inlet port 20 and direct air to the combustion chamber 11.

Figure 2B:
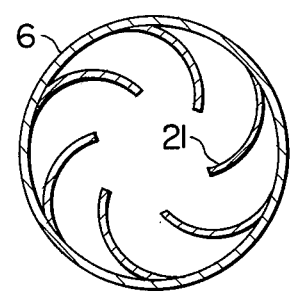
FIG. 2B is a sectional view of guide vanes taken along line A—A' of FIG. 2A.

FIG. 2B shows in cross-section guide vanes 21 fixed to the inner peripheral wall of the inner housing 6 and to the partition wall 10. The guide vanes 21 comprise a plurality of spirally arranged vanes or blades which are effective to guide and stabilize air flow leaving the combustion fan 17 toward the combustion chamber.

Referring to FIGS. 1 and 2A, a fuel injection nozzle 22 is connected via a fuel pump 3 with a fuel tank 24 by means of a conduit 23, and is adapted to continuously inject a predetermined amount of fuel.

The fuel injection nozzle 22 is supported on the partition wall 10. An ignition plug 26 is located close to the fuel injection nozzle 22, and is electrically connected to an igniter 25 capable of controlling the ignition plug 26 for ignition at the time of starting of the apparatus. As shown in FIG. 1, the igniter 25 is electrically connected to motors for driving the fuel pump 3 and the hydraulic pump 4, thus synchronizing ignition and circulation.

Figure 3A:
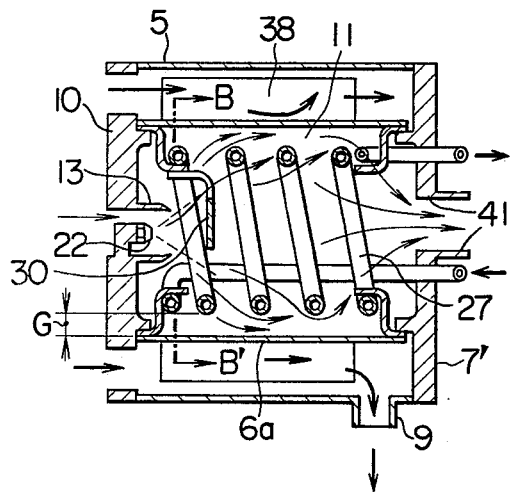
FIG. 3A is a sectional elevational view of a combustion chamber incorporated in the preheating means of FIG. 1.

Referring to FIGS. 2A and 3A, a cylindrical-shaped burner tube 13 is secured to and projects through the partition wall 10 into the combustion chamber 11. Adjacent to the end of the burner tube on the side of the combustion chamber is provided a swirler 14 which is secured to the inner peripheral wall of the burner tube 13 and is adapted to guide flame spirally from the injection nozzle 22 toward the combustion chamber 11.

Referring to FIG. 3A, the first portion 6a of the inner housing is substantially cylindrical-shaped, and is supported by the partition wall 10 and the end wall 7' of the outer housing 5. It is to be noted that the first portion 6a is neither fixed to the partition wall 10 nor to the end wall 7' so as to accommodate thermal expansion during the operation of the apparatus. The first portion 6a mounts at its outer peripheral wall a plurality of heat radiating fins 38 for heating air flowing through the space between the outer and the inner housings.

Figure 3B:
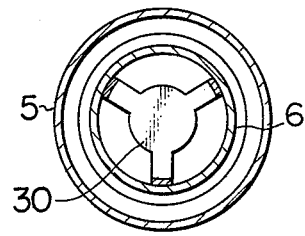
FIG. 3B is a cross-sectional view of outer and inner housings carrying a baffle plate taken along line B—B' of FIG. 3A.

Within the combustion chamber 11 defined by the first portion of the inner housing, there are disposed a baffle plate 30 and a coiled water heating tube 27. As shown in FIG. 3B, the baffle plate 30 is in the form of a disk and is secured to the partition wall 10 through three legs. As will be detailed hereinafter, the size of the baffle plate, as well as the distance between the baffle plate 30 and the fuel injection nozzle 22 may be varied to deflect combustion flame, thereby suitably distributing heat to the water heating tube 27 and to the first portion 6a.

The coiled water heating tube 27 is supported by the partition wall and by the end wall 7' of the outer housing, and is connected at its one end to one end of a radiator 29 of the vehicle and at its other end to the other side of the radiator to form a closed loop.

Referring to FIGS. 1 and 3A, an exhaust duct 31 is connected to the combustion gas outlet port 41 formed in the end wall 7' of the outer housing for directing the combustion gas generated in the combustion chamber to the engine 32 and the battery 37 of the vehicle 28 to heat them up. At the branched portion of the exhaust duct 31 is provided a valve mechanism 33, such as a butterfly valve, adapted to be operated from outside of the apparatus to suitably distribute the combustion gas to the oil pan of the engine 32 and to the battery 37. One of the outlet ports 9' on the peripheral surface of the outer housing is communicated with the cabin 35 of the vehicle through a duct 34, and the other of the outlet ports 9 is communicated with the space around the battery 37 through a duct 36 to deliver heated clean air to the space around the battery.

As described above, the baffle plate disposed forwardly of the fuel injection nozzle is effective to deflect the combustion flame to distribute heat to the water heating tube and to the inner housing. Therefore, the ratio of the quantities of heat delivered to the water heating tube and to the inner housing can be varied by changing the size of the central disk portion of the baffle plate and the position of the baffle plate in the axial direction of the combustion chamber.

The coil diameter of the coiled water heating tube 27 significantly influences the distribution of heat. That is, water flows through the water heating tube 27 at a velocity to define a water cooled wall in the combustion chamber, the wall being of a temperature since the temperature of the water heating tube is raised by 30° to 50° C from that of water to become −10° to +130° C. Therefore, the condition of combustion is varied, so that the temperature distribution in the combustion gas is varied. When the water heating pipe 27 is located in close proximity to or adjacent to the outer wall of the combustion chamber, that is, the first portion 6a of the combustion chamber, serving as a heat exchanger for air, the amount of 60 to 90 percent of the total heat output is imparted to water flowing through the pipe 27, and the ratio of the total heat output to the total heat input is lowered. The reason for this is that the fine particles of fuel at the injection nozzle 22 are left unburned in the vicinity of the cooling wall defined by the coiled water heating tube to be condensed and to be held as ambient fuel between the water heating tube 27 and the combustion chamber 11.

Figure 4:
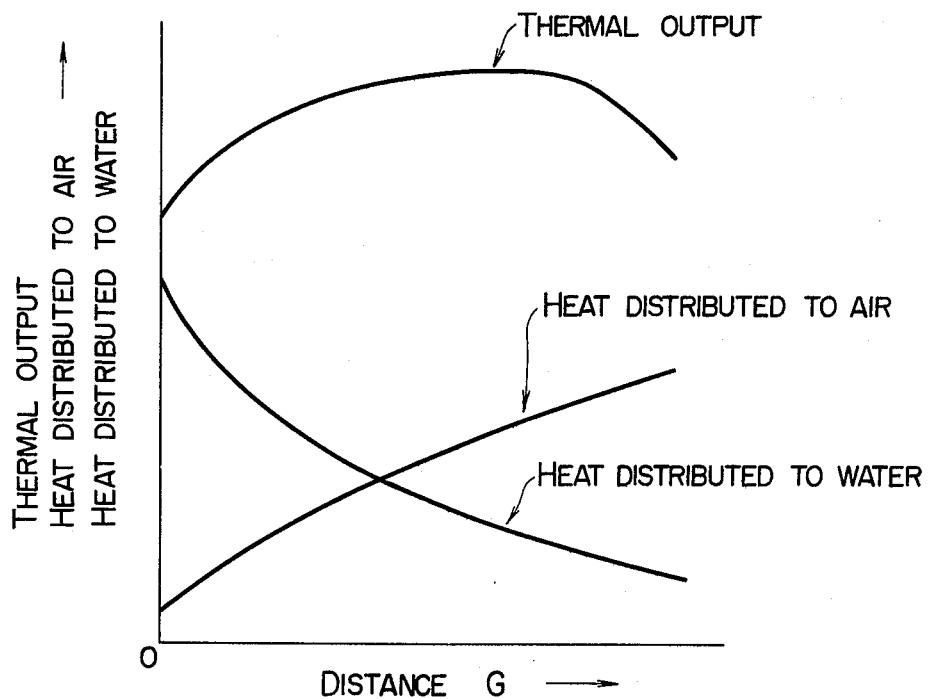
FIG. 4 is a plot illustrating thermal outputs for varying clearances between the water heating tube and the wall of the combustion chamber.

To the contrary, when the water heating tube is located around the center of the combustion chamber, the amount of the heat output delivered to the first portion 6a of the inner housing for heating air is increased, and the amount of the heat output delivered to the water heating tube is reduced, although there is a practical limit for reducing the respective diameters of the coil and the tube from the viewpoint of manufacture. Also, when the respective diameters of the coil and the tube itself are reduced, the area of heating surface is reduced for a given number of turns of the coil. In addition, an extremely small coil diameter of the water heating tube causes the inner cylindrical-shaped surface defined by the water heating tube to serve as a cooling wall, so that combustion is deteriorated to unfavorably lower the thermal efficiency. These thermal characteristics are shown in FIG. 4 in which the axis of abscissa represents the distance G between the water heating tube and the wall of the combustion chamber, and the axis of ordinate represents the total amount of heat generated in the combustion chamber, and the amount of heat distributed to water and to clean air.

In operation, upon closing of a switch 18, the fan motor 15 is energized to drive the clean air suction fan 16 and combustion fan 17. And in synchronism with the energization of the fan motor, the fuel pump 3, igniter 25 and hydraulic pump 4 are actuated. The fuel pump 3 directs the fuel under pressure from the fuel tank 24 to the fuel injection nozzle 22, from which the fuel is injected to be ignited by the ignition plug 26. Once ignited, the continuous feed of fuel is effective to maintain a good combustion within the combustion chamber 11. At this time, clean air is introduced through the first and second clean air inlet ports 8 and 20 into the clean air introduction chamber 12. The flow of the clean air is then stabilized by the guide vane assembly 21 and is then forced into the combustion chamber 11.

As the combustion is commenced, the resulting heat is transferred to the water heating tube 27 and the wall of the inner housing 6 enclosing the tube 27. Water passing through the heating tube 27 is heated and is circulated by the pump 4 through the radiator 29, while the clean air sucked by the clean air sucking fan 16 is heated by the radiant heat from the wall of the inner housing 6 and from the radiation fins 38, and is then forced out through the clean air outlet port 9' to be distributed to the cabin 35 and through the clean air outlet port 9 to the space around the battery 37 to thereby heat same. It is, of course, possible to control the flow rate of the heated air by suitable means. The combustion gas discharged from the combustion chamber 11 is directed by the exhaust duct 31 to the space around the engine 32 to thereby facilitate the starting thereof. Since the temperature of the combustion gas is in the order of 400° to 500° C, the gas is effective to ensure the starting of the engine even in intense cold districts. Thus, the heat generated in the combustion chamber is effectively used for heating the cabin, engine and accessories of the vehicle through the medium of air, water and exhaust gas. The distribution of heat to the elements of a the vehicle is optimized by the baffle plate 30 projecting into the combustion chamber 11.

According to the above-described embodiment of the invention, hot clean air and hot water can be readily generated, and the heat retained by the exhaust gas is also effectively used for preheating up the engine. With the arrangement of the above-described embodiment, the combustor can be reduced in size so as to be mounted on vehicles, and efficiency of heat exchange is highly improved owing to the fact that the water heating tube is in the form of coil. In addition, the pressurized fuel injection performed by the fuel injection nozzle ensures good starting characteristics of the heating apparatus, thus promising an instantaneous warming up of the cabin and the engine even in intense cold districts.

Although a preferred embodiment has been described above, it is to be understood that various changes and modifications can be made without departing from the scope of the invention defined by the appended claims.

What is claimed is:

1. Preheating and warming apparatus for use with motor vehicles and having a cabin and other accessories, such as a radiator, a battery, and an engine, said apparatus comprising:
    an outer housing;
    an inner housing disposed in substantial axial alignment within the outer housing, said inner housing having one common end wall with the outer housing and further having heat radiating walls;
    a clean air inlet port formed in another end wall of the outer housing;
    an annular chamber formed between the inside wall of the outer housing and the outside wall of the inner housing;
    at least two clean air exit ports formed in the annular chamber;
    a combustion gas outlet port formed in the common end wall of the inner housing with the outer housing;
    a partition wall dividing the interior space of the inner housing into a clean air introduction chamber on one side thereof and into a combustion chamber on the other side thereof;
    a nozzle means mounted on the partition wall for injecting fuel into the combustion chamber;
    a water heating tube disposed within the combustion chamber;
    a duct for delivering heated clean air from one of said clean air exit ports to a cabin of a motor vehicle;
    a duct for delivering heated clean air from the other of said clean air exit ports to a space surrounding an accessory of the motor vehicle;
    a plurality of ducts for delivering hot combustion gas from the combustion gas outlet port to a plurality of accessories, each located at different locations of the motor vehicle; and
    a water line for delivering water from a radiator of the motor vehicle to the water heating tube and for returning the water at a higher temperature from the water heating tube to the radiator.

2. Preheating and warming apparatus for use with vehicles, as claimed in claim 1, wherein one of the accessories is a battery.

3. Preheating and warming apparatus for use with vehicles, as claimed in claim 1, wherein one of the accessories is an oil pan of an engine.

4. Preheating and warming apparatus for use with vehicles, as claimed in claim 1, further comprising:
    a fan motor secured to an inside wall of the outer housing adjacent to the clean air inlet port;
    a fuel pump connected to the fuel injection nozzle means;
    an igniter mounted on the partition wall closely adjacent to the fuel injection nozzle means;
    a hydraulic pump connected into the water line between the radiator and the water heating tube; and
    an electric switch connected to the fan motor, the fuel pump, the igniter, and the hydraulic pump;
    whereby, upon energization of the electric switch, hot air and hot water are simultaneously obtained.

5. Preheating and warming apparatus for use with vehicles as claimed in claim 1, wherein said fuel injection nozzle means is of pressure injection type, and pressurized liquid fuel is supplied independently of the air feed system to the fuel injection means of pressure injection type.

6. Preheating and warming apparatus for use with vehicles as claimed in claim 5, further comprising a guide vane assembly disposed within said clean air introduction chamber.

7. Preheating and warming apparatus for use with vehicles as claimed in claim 5, wherein said water heating tube is disposed spaced away from the inside wall of said combustion chamber.

8. Preheating and warming apparatus for use with vehicles as claimed in claim 5, wherein said water heating tube is connected to a radiator of an engine of said vehicle to form a closed loop for circulating hot water therethrough.

9. Preheating and warming apparatus for use with vehicles as claimed in claim 5, further comprising a swirler disposed in the vicinity of said fuel injection nozzle means.

10. Preheating and warming apparatus for use with vehicles as claimed in claim 1, further comprising a guide vane assembly disposed within said clean air introduction chamber.

11. Preheating and warming apparatus for use with vehicles as claimed in claim 3, wherein said water heating tube is disposed spaced away from the inside wall of said combustion chamber.

12. Preheating and warming apparatus for use with vehicles as claimed in claim 3, wherein said water heating tube is connected to a radiator of an engine of said vehicle to form a closed loop for circulating hot water therethrough.

13. Preheating and warming apparatus for use with vehicles as claimed in claim 3, further comprising a swirler disposed in the vicinity of said fuel injection nozzle means.

14. Preheating and warming apparatus for use with vehicles as claimed in claim 1, wherein said water heating tube is disposed spaced away from the inside wall of said combustion chamber.

15. Preheating and warming apparatus for use with vehicles as claimed in claim 4, further comprising a swirler disposed adjacent to said fuel injection nozzle means.

16. Preheating and warming apparatus for use with vehicle as claimed in claim 1, further comprising a swirler disposed adjacent to said fuel injection nozzle means.

* * * * *